United States Patent [19]

Gentry

[11] 4,309,171

[45] Jan. 5, 1982

[54] BILLET HEATING FURNACE WITH PRESSURIZED ENTRANCE SEAL

[75] Inventor: Charles B. Gentry, Belmont, Mich.

[73] Assignee: Granco Equipment, Inc., Belding, Mich.

[21] Appl. No.: 153,050

[22] Filed: May 27, 1980

[51] Int. Cl.³ .............................................. F27B 3/04
[52] U.S. Cl. .................................... 432/163; 34/242; 432/176; 432/179; 432/194; 432/242
[58] Field of Search ............... 432/163, 164, 176, 179, 432/194, 242; 34/242

[56] References Cited

U.S. PATENT DOCUMENTS

| | | | |
|---|---|---|---|
| 1,489,554 | 4/1924 | Straight | 432/78 |
| 1,658,333 | 2/1928 | Hanley, Jr. | 432/176 X |
| 2,003,451 | 6/1935 | Ladd | 432/164 X |
| 2,081,954 | 6/1937 | Phillips | 432/176 X |
| 2,088,554 | 7/1937 | Robson et al. | 432/176 X |
| 2,253,897 | 8/1941 | Doderer | 432/242 |
| 3,314,666 | 4/1967 | Gajardo | 432/82 |
| 3,837,794 | 9/1974 | Phillips | 432/8 |
| 3,841,614 | 10/1974 | Okuno | 432/164 X |
| 4,022,571 | 5/1977 | Gentry et al. | 432/180 |
| 4,102,636 | 7/1978 | Phillips et al. | 432/180 X |

Primary Examiner—John J. Camby
Attorney, Agent, or Firm—John E. McGarry; Richard A. Gaffin

[57] ABSTRACT

A furnace (10) has a preheater zone (12) into which exhaust gases of a combustion chamber (14) are recycled for preheating of articles passing through the furnace. The exhaust gases are supplied to the preheater zone (12) through jet pipes (18) which create a turbulent flow about the articles in the furnace (10). The exhaust gases are withdrawn by a fan (30) which is disposed in a duct (34) adjacent to the furnace entrance (13). To prevent the introduction of ambient air into the furnace (10), a pressure chamber (56), which is maintained at an elevated pressure relative to the ambient air, is provided within the preheater zone (12), with the chamber (56) pressurized by gases supplied by the jet pipes (18). A sealing arrangement defined by the pressure chamber (56) and the articles passing through the furnace prevents the introduction of cool air through the preheater zone (12). In this way, the thermal efficiency of the fuel burned within the combustion chamber (14) is maximized while a pressure balance is maintained in the furnace.

18 Claims, 2 Drawing Figures

BILLET HEATING FURNACE WITH PRESSURIZED ENTRANCE SEAL

BACKGROUND OF THE INVENTION

1. Field of the Invention:

The invention relates to a furnace for heating articles in which the exhaust gases of the combustion chamber are recirculated for preheating of the articles, the furnace having a partially sealed pressure chamber disposed at the front end of the preheating section to prevent the introduction of ambient air into the furnace.

2. State of the Prior Art:

It is common to use furnaces having an elongated heating chamber for heating billets for logs used in extrusion or similar metal working operations. A typical furnace has an elongated heating chamber in which burners are disposed along the length of the furnace to direct burning gases against the billets as they move through the heating chamber. Such furnaces are often of the flame impingement type in which the burner flames envelope the billets within the furnace.

It is known to use the exhaust gases of the combustion chamber to preheat the billets within the furnace. In U.S. Pat. No. 3,837,794, issued Sept. 24, 1974, a billet heating furnace similar to that described above is disclosed in which hot combustion gases are drawn through a preheating zone for heat exchange with the articles passing therethrough. It is also known to exchange the heat of the combustion gases with combustion air and supply this air to a preheating zone as well as to burners in a heating chamber. Such a furnace is disclosed in U.S. Pat. No. 4,022,571, issued May 10, 1977. Additionally, U.S. Pat. No. 3,841,614, issued Oct. 15, 1974, discloses an apparatus for preheating articles in which the hot exhaust gases are supplied through jet nozzles in a preheater zone in order to provide a turbulent flow about the articles being preheated.

In the above-described furnaces, it is important to maintain a pressure balance throughout the length of the furnace. In this way, the introduction of ambient air into the furnace, which reduces the efficiency of operation of the furnace, is minimized. The need for maintaining such a pressure balance is especially important when the furnace includes an exhaust fan near the inlet section. A fan located near the inlet creates a low-pressure zone in the preheater section through which ambient air may be drawn.

SUMMARY OF THE INVENTION

In order to increase the thermal efficiency of the fuel burned within the furnace, it is desirable to prevent the introduction of ambient air into the preheater section. A pressure seal arrangement disposed within the preheater section permits a more thorough transfer of the heat from the exhaust gases to the articles within the furnace. The present invention includes a heating furnace similar to those described above in which the preheater zone is provided with a pressure sealing arrangement in accordance with the present invention. The sealing arrangement defines a pressurized chamber which is maintained at close to atmospheric pressure to minimize the introduction of ambient air into the furnace.

The furnace comprises a preheater section and a heating chamber similar to the arrangement described in U.S. Pat. No. 4,022,571. The heating chamber includes a plurality of burners which direct hot gases against articles passing through the furnace. A fan communicates with the preheater section to withdraw exhaust gases from the furnace, with the exhaust gases being pressurized and recirculated to the preheater zone. The pressurized exhaust gases are introduced into a preheater zone through jet pipes which create a turbulent gas flow. The entrance end of the preheater zone includes a pressurized chamber which is maintained at an elevated pressure with respect to the preheater zone by the exhaust gases to prevent the introduction of ambient air.

In operation, the articles to be heated pass through the preheater zone and the heating chamber during which time the articles are heated to the desired temperature. The hot gases within the combusion chamber are drawn through an exhaust conduit disposed near the entrance to the preheater zone by a fan. The fan in the exhaust conduit draws the hot gases from the furnace and pressurizes the recycled exhaust gases so that upon reintroduction into the preheater zone through a jet pipe, a turbulent flow about the articles passing through the preheater zone is created. In this way, the heat transfer capabilities of the gases within the preheating and combustion chamber zones are increased.

The fan disposed within the exhaust conduit provides a forced-draft arrangement for removing gases from the furnace while providing a means of pressurizing the gases prior to the reintroduction into the preheater zone.

In order to more efficiently use the fuel burned within the furnace, a pressure chamber is provided at the entrance end of the preheater zone. The pressure chamber includes an inlet and an outlet which conform to the shape of the billets or logs to provide a sealing arrangement. Such a sealed pressure chamber prevents the introduction of ambient air into the preheater end of the furnace and reduces the dilution of the exhaust gases drawn through the exhaust conduit. In this way the heat transfer capabilities of the combustion gases are maximized.

The furnace according to the present invention eliminates the need for providing a heat exchanger in order to recover the heat content of the exhaust gases. A single fan in the exhaust conduit can maintain the pressure balance within the furnace and provide sufficient pressure to the jet pipes or maintain pressure within the pressurized chamber. Additionally, the pressurization of the exhaust gases prior to their introduction into the preheater zone increases the turbulence within the preheater, thereby maximizing the heat transfer of the gases.

The invention provides a high temperature, high pressure source of exhaust gases which can be partially conveyed to other low temperature process ovens where exhaust heat can be utilized summer or winter, regardless of local climate conditions. This secondary use of the hot exhaust raises the efficiency of the billet furnace to values greater than 60%. Even without the secondary use of the exhaust gases, efficiencies in excess of 60% have been achieved.

BRIEF DESCRIPTION OF THE DRAWINGS

The invention will be described with reference to the accompanying drawings wherein like members bear like reference numerals, in which.

DETAILED DESCRIPTION OF THE PREFERRED EMBODIMENT

Figure 1:
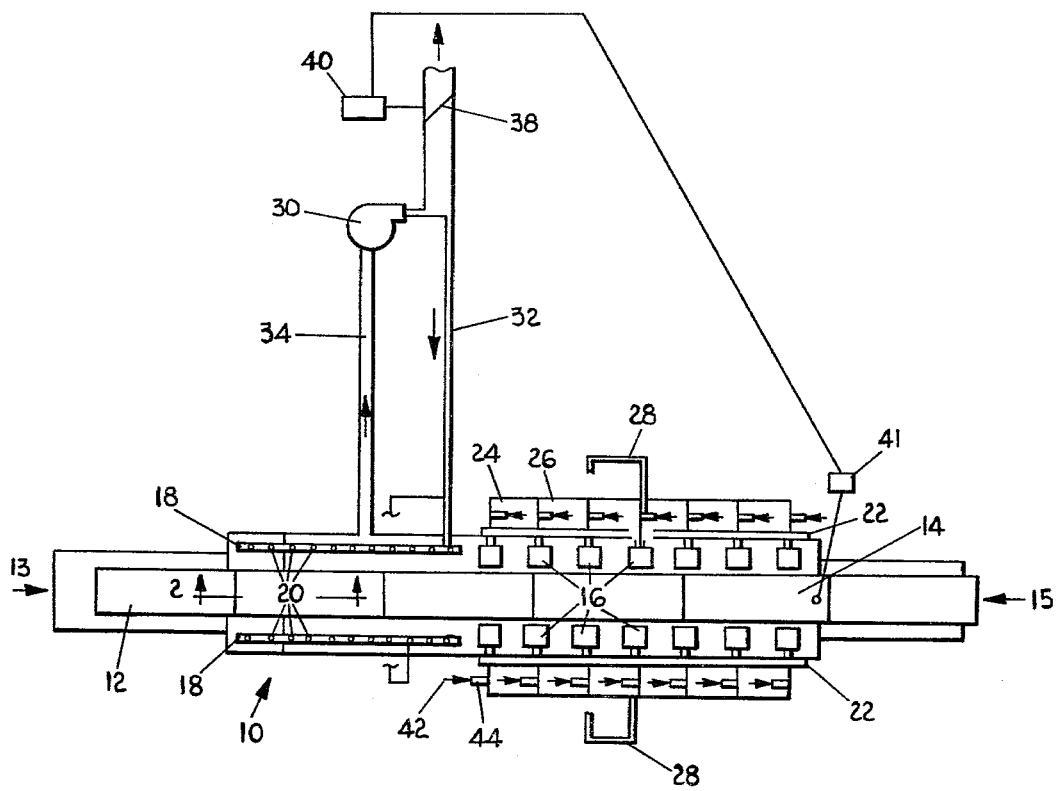
FIG. 1 is a schematic representation of a furnace according to the invention showing an air flow system including direct recirculation of exhaust gases into the furnace.

With reference to FIG. 1, a heating furnace 10 is shown having a fired heating chamber 14 and an unfired preheater zone 12. The preheater zone 12 includes an entrance 13 through which billets or logs enter the furnace 10. The billets or logs are pushed through the furnace in a conventional manner such as that disclosed in U.S. Pat. No. 3,837,794 (issued Sept. 24, 1974).

A plurality of gas burners 16 are disposed along the length of the heating chamber 14. A gas manifold 22 supplies fuel to the burners 16 while combustible air is provided through air pipes 24 and the manifold 26. Within the preheater section 12 are jet pipes 18 which extend longitudinally along the preheater zone 12. The jet pipes 18 preferably do not extend into the heating chamber 14 of the furnace. In order to provide turbulent gas fluid in the preheater zone 12, the jet pipes 18 are provided with nozzles 20 which are formed by small openings in the pipes 18.

Although the furnace uses natural gas to supply the gas burners 16 with fuel, a liquid fuel, such as fuel oil, may be supplied through a conduit 42 and atomized by injectors 44 into the heated combustion air. Such an embodiment of the invention including the fuel conversion means is disclosed in U.S. Pat. No. 4,022,571 and does not form a part of the present invention.

A duct 34 which communicates with a fan 30 withdraws exhaust gases generated within the furnace. The exhaust duct 34 is disposed adjacent to the entrance of the furance to provide for maximum heat recovery from the exhaust gases. In placing the exhaust duct near the entrance to the furnace, the exhaust gases are drawn over the articles passing through the furnace so as to preheat them prior to entering the heating chamber. The exhaust fan 30 creates a positive draft within the furnace to aid the removal of the exhaust gases. The countercurrent flow of gases within the furnace creates a pressure differential, with the exit end typically at a slightly positive pressure or near zero, and the entrance end at a negative pressure, for example 5-6 in water column.

In order to provide maximum heat transfer of the combustion gases, it is desirable to recirculate the gases into the preheater zone 12 of the furnace. Accordingly, a supply conduit 32 communicates the exhaust of the fan 30 with the jet pipes 18 disposed in the preheater zone. The fan 30 pressurizes the hot exhaust gases before passing them to the jet pipes 18 in order to increase the turbulent flow into the preheater zone. The pressure within the furance is regulated by means of a damper valve 38 disposed within a stack 36 provided on the exhaust fan. The damper valve 30 is regulated by valve actuator 40 which responds to the pressure at the exist end of the furnace to maintain the pressure therein at a predetermined value at or about atmospheric pressure. To this end a pressure sensor 41 is provided at the discharge section 14 of the furnace with a conventional probe to detect the pressure at such location.

Figure 2:
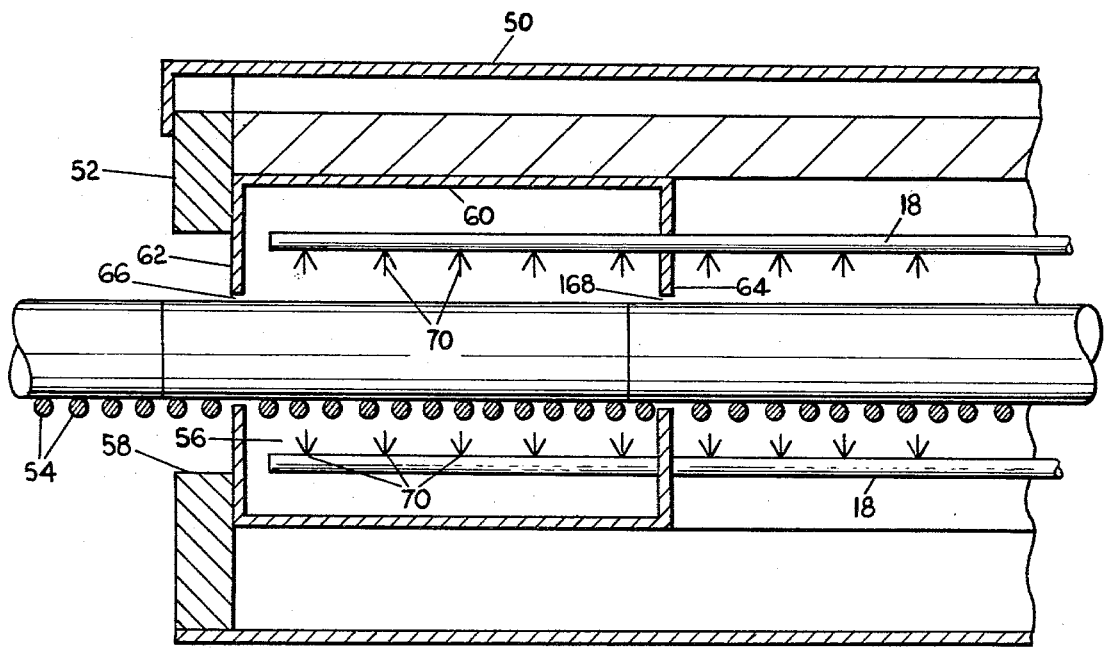
FIG. 2 is a sectional view taken along line 2—2 of FIG. 1.

With reference to FIG. 2, the pressure seal arrangement of the invention is shown. A furnace housing 50 is lined with a suitable refractory material 52 in a conventional manner. The jet pipes 18 extend along the length of the preheater zone 12 as described above. The pattern of the gases as they emminate from the pipes is illustrated by lines indicated by the number 70. A billet entrance port 58 is provided in the wall of the furnace housing 50 to allow introduction of the billets or logs into the furnace. The billet entrance port 58 places a relatively large opening at the entrance end 13 of the furnace through which ambient air may be drawn, thereby reducing the heat transfer capability of the gases within the furance. Accordingly, the present invention includes a pressure chamber 56 disposed within the entrance section of the preheater zone 12 to seal the preheater zone from the ambient air.

The pressure chamber 56 typically includes a longitudinally extending housing 60 disposed adjacent to the walls of the furance lining 52. The pressure chamber 56 extends over only the entrance portion of the length of the preheater 29 to define a first pressure section and a second section of relatively lower pressure within the preheater. A pair of end plates 62, 64 are provided at the ends of the cylinder 60 to enclose the pressure chamber. In this way, a partially sealed chamber is created in which pressurized gases may be introduced in order to prevent the introduction of ambient air. The pressure chamber is supplied with pressurized gas through jet pipes 18, with the ends of the jet pipes being enclosed within the chamber 56. In order to allow the introduction of billets into the furnace it is necessary to provide openings 66, 68 in the end plates 62, 64 of the pressure chamber. The openings generally conform to the size of the billets or logs passing through the furnace. Accordingly, when articles are introduced into the entrance end of the preheater zone a sealing relationship is formed by the openings in the end plates 66, 68 and the articles passing through the preheater.

The size and/or spacing of the nozzles 20 are selected to provide the desirable pressure in the pressure chamber 56, taking into consideration the leakage around the billets 12 and the jet pipes 18.

In operation, billets or logs are fed through the entrance 13 of the furnace so they pass through the preheater section 12 and the heating chamber 14. After the billets are heated to the desired temperature they are withdrawn through the exit end 15 of the furnace. The gas burners 16 disposed within the heating chamber 14 heat the billets or logs by direct flame impingement from the burners. Due to the forced draft within the furnace created by the fan 30, the gases of combustion within the heating chamber are drawn into the preheater section and exhausted through conduit 34. The exhaust gases are pressurized in fan 30 and a portion of the gases are then reintroduced into the preheater zone 12 through conduit 32 which is connected with the outlet of the fan 30. The hot exhaust gases are thereby recirculated to the preheater zone by means of jet pipes 18, which create a turbulent flow about the articles passing through the preheater zone. Such a turbulent flow increases the heat transfer capabilities of the exhaust gases.

Since the end portions of the jet pipes 18 are disposed within the pressure chamber 56 which is closed by the seal defined by the articles and the parts 66, 68, the chamber 56 is maintained at an elevated pressure relative to the ambient air. In this way, the introduction of ambient air into the entrance end of the furnace is minimized. In eliminating the introduction of ambient air into the furnace, the exhaust gases are maintained at a relatively high temperature which increases the preheating of the articles passing through the furnace.

Additionally, the single fan provided in the exhaust conduit serves to withdraw exhaust gases from the furnace as well as supply preheating gases into the preheater zone. Previously, separate fans have been used to perform these two functions.

The present invention increases fuel efficiency by recirculating exhaust gases which are maintained at a maximum temperature. The pressure chamber disposed at the entrance end of the preheater zone provides a means for minimizing the induction of ambient air into the furnace. In this way, the thermal efficiency of the gases burned within the heating chamber is maximized. A turbulent gas flow within the preheater zone also serves to increase the heat transfer from the gases to the articles passing through the furnace. The sealing arrangement provided at the front end of the furnace allows a forced draft exhaust system which is disposed at the front end of the furnace to be employed. In this way, the counter-current flow of the exhaust gases over the articles passing through the furnace aids the preheating of the articles and provides the desired pressure gradient in the furnace.

Accordingly, the present invention improves over the prior known furnaces by increasing the thermal efficiency of the fuel burned within the heating chamber by reducing the intake of ambient air. The furnace uses both convection and flame impingement heating of articles passing through the furnace. The pressure chamber arranged within the preheater zone permits the use of a forced air exhaust system without reducing the temperature of the exhaust gases due to the introduction of ambient air.

The foregoing specifications and drawings are merely illustrative of the present invention and are not intended to limit the invention to the disclosed embodiment. Variations and changes which are obvious to one skilled in the art are intended to be within the scope and nature of the invention which is defined by the appended claims.

The embodiments of the invention in which an exclusive property or privilege is claimed are defined as follows:

1. In a furnace for heating articles to an elevated temperature wherein the articles are moved serially from an entrance end of the furnace to an exit end thereof comprising:
   a preheater section at an entrance end of the furnace and a heating chamber at an exit end thereof;
   means in said heating chamber for directing combustible gases against the articles therein;
   means for providing turbulent gas flow along the length of said preheater section;
   exhaust means for drawing the exhaust gases of said combustible gases from the furnace;
   said exhaust means drawing said exhaust gases from said heating chamber to said preheater section;
   means for pressurizing said exhaust gases;
   means for communicating said pressurized exhaust gases with said means providing turbulent gas flow;
   the improvement which comprises:
   means in said preheater section defining first and second chambers therein, said first chamber extending from the entrance end of the furnace along a portion of the length of said preheater section and said second chamber extending from said first chamber to said heating chamber; and
   means for maintaining said first chamber at a first pressure greater than atmospheric pressure with pressurized exhaust gases provided within said preheater section and said second chamber at a lower pressure relative to said first pressure.

2. The furnace of claim 1 wherein said exhaust means communicates with said preheater section.

3. The furnace of claim 1 wherein said exhaust means is provided with a fan which draws exhaust gases from the furnace.

4. The furnace of claim 3 wherein an outlet of the fan is in fluid communication with said pressurized chamber.

5. The furnace of claim 1 wherein said means for providing turbulent gas flow is at least one elongate jet pipe, said at least one jet pipe including nozzles for impinging pressurized gas against articles in said preheater section.

6. The furnace of claim 5 wherein said means defining said first and second chambers includes a first plate adjacent the entrance end of said furnace and a second plate spaced inwardly from an end of said jet pipe.

7. The furnace of claim 6 wherein said means for maintaining said first chamber at a first pressure comprises an end of the at least one elongate jet pipe adjacent said furnace entrance, said end of said pipe being disposed within said first chamber.

8. The furnace of claim 6 wherein said first and second plates include openings which closely conform to the configuration of articles which are heated in said furnace whereby said openings and said articles define a gap sealing arrangement.

9. The furnace of claim 1 wherein said means for directing combustible gases includes burner means for burning combustible fluids.

10. The furnace of claim 9 wherein said burners are of the flame-impingement type.

11. The furnace of claim 1 and further comprising means for maintaining the pressure in said heating chamber at a predetermined value.

12. In a method for heating articles to an elevated temperature wherein:
   the articles are passed serially through preheater and heater zones in a furnace for heating;
   combustible gases are supplied to said heater zone and burned therein to heat the articles;
   the hot exhaust gas products of the combustible gases are removed from the preheater zone through a fan to create a negative pressure gradient extending along the furnace from the heater zone to the preheater zone;
   the hot exhaust gases are pressurized and returned to said preheater zone in a turbulent flow around the articles passing through the preheater zone for preheating of the articles;
   the improvement which comprises:
   providing a substantially closed chamber at an entrance end of the preheater zone to define a pressure zone within said preheater zone, said closed chamber enveloping the articles passing into the preheater zone in a closely conforming relationship to define a gap seal between said closed chamber and said articles; and
   maintaining said substantially closed chamber at greater than atmospheric pressure by supplying the pressurized exhaust gases thereto while maintaining the negative pressure gradient between the heater zone and the remaining portion of the preheater zone;

wherein said pressurized chamber minimizes the induction of ambient air into the furnace without affecting the negative pressure gradient between the heater zone and the remaining portion of the preheater zone.

13. The method of heating articles according to claim 12 wherein said step of supplying exhaust gases to said preheater zone includes directing jets of hot gas through a jet pipe and nozzles therein.

14. The method of heating articles according to claim 12 wherein said exhaust gases are removed from the furnace through a conduit disposed in the preheater zone.

15. The method of heating articles according to claim 12 wherein said pressurizing step includes communicating the outlet of said fan with said closed chamber.

16. The method of heating articles according to claim 15 wherein said exhaust gases are communicated to an elongate jet pipe arranged in said closed chamber.

17. The method of heating articles according to claim 12 wherein said combustible gases are supplied by flame-impingement burners.

18. The method of claim 12 wherein the hot exhaust products are removed from the preheater zone downstream of the closed chamber.

* * * * *